United States Patent
Guo et al.

(10) Patent No.: US 9,749,991 B2
(45) Date of Patent: Aug. 29, 2017

(54) METHOD FOR INSTRUCTING CSI FEEDBACK SIGNALING CONFIGURATION AND BASE STATION

(71) Applicants: Senbao Guo, Shenzhen (CN); Yu Ngok Li, Shenzhen (CN); Junfeng Zhang, Shenzhen (CN)

(72) Inventors: Senbao Guo, Shenzhen (CN); Yu Ngok Li, Shenzhen (CN); Junfeng Zhang, Shenzhen (CN)

(73) Assignee: ZTE Corporation (CN)

( * ) Notice: Subject to any disclaimer, the term of this patent is extended or adjusted under 35 U.S.C. 154(b) by 171 days.

(21) Appl. No.: 14/400,029

(22) PCT Filed: Apr. 26, 2013

(86) PCT No.: PCT/CN2013/074793
§ 371 (c)(1),
(2) Date: Nov. 10, 2014

(87) PCT Pub. No.: WO2013/166923
PCT Pub. Date: Nov. 14, 2013

(65) Prior Publication Data
US 2015/0098347 A1    Apr. 9, 2015

(30) Foreign Application Priority Data

May 10, 2012    (CN) .......................... 2012 1 0144327

(51) Int. Cl.
*H04W 72/02* (2009.01)
*H04L 5/00* (2006.01)
(Continued)

(52) U.S. Cl.
CPC .......... *H04W 72/02* (2013.01); *H04B 7/0626* (2013.01); *H04L 5/0048* (2013.01);
(Continued)

(58) Field of Classification Search
CPC ... H04B 7/0626; H04L 1/0026; H04L 1/0027; H04L 5/0057; H04L 5/0053; H04W 72/0413; H04W 52/243; H04W 72/02
See application file for complete search history.

(56) References Cited

U.S. PATENT DOCUMENTS

| | | | | |
|---|---|---|---|---|
| 2012/0147831 A1* | 6/2012 | Golitschek | ............ | H04L 1/0026 370/329 |
| 2013/0163499 A1* | 6/2013 | Cheng | ................. | H04W 72/005 370/312 |
| 2014/0192704 A1* | 7/2014 | Yi | ......................... | H04W 24/10 370/315 |

FOREIGN PATENT DOCUMENTS

| | | |
|---|---|---|
| CN | 101877608 | 11/2010 |
| CN | 102315871 | 1/2012 |

(Continued)

OTHER PUBLICATIONS

Toufik et al ("LTE—The UMTS Long Term Evolution—From Theory to Practice", 2009, John Wily & Sons Publication, Chapter 9.*

(Continued)

*Primary Examiner* — Omer S Mian
(74) *Attorney, Agent, or Firm* — McAndrews, Held & Malloy, Ltd.

(57) ABSTRACT

A method for instructing CSI feedback signaling configuration and base station are provided, the method comprising: a base station side notifies a terminal side, via the first higher layer signaling of a UE-Specific, a CSI-RS resource for measuring CSI, the CSI-RS resource comprising at least one of: the time frequency position of the CSI-RS resource in a subframe, the aerial port number configuration of the CSI-RS resource, a period and a subframe offset of the CSI-RS resource, the sequence identifier of the CSI-RS resource, and the power control information of the CSI-RS resource; the (Continued)

base station side instructs the terminal side to feed back the CSI corresponding to the CSI-RS resource. In the present invention, the base station side flexibly configures the terminal side to feed back various kinds of CSI information, thus enabling the base station side to flexibly and dynamically acquire the CSI, and in turn realizing precise link self-adaption and data transmission, and reducing the uplink feedback overhead and measurement complexity of the terminal side.

9 Claims, 1 Drawing Sheet

(51) Int. Cl.
| | |
|---|---|
| *H04W 72/04* | (2009.01) |
| *H04B 7/06* | (2006.01) |
| *H04W 24/08* | (2009.01) |
| *H04W 52/24* | (2009.01) |
| *H04W 74/08* | (2009.01) |
| *H04W 88/02* | (2009.01) |
| *H04W 88/08* | (2009.01) |

(52) U.S. Cl.
CPC .......... *H04L 5/0053* (2013.01); *H04L 5/0057* (2013.01); *H04L 5/0094* (2013.01); *H04W 24/08* (2013.01); *H04W 52/243* (2013.01); *H04W 72/0413* (2013.01); *H04W 74/0833* (2013.01); *H04W 88/02* (2013.01); *H04W 88/08* (2013.01)

(56) References Cited

FOREIGN PATENT DOCUMENTS

| | | |
|---|---|---|
| EP | 2624473 A2 | 8/2013 |
| KR | 20120033283 A | 4/2012 |
| WO | 2012/028205 | 3/2012 |

OTHER PUBLICATIONS

International Search Report for International Patent Application No. PCT/CN2013/074793 mailed Jul. 25, 2013.

Supplementary European Search Report corresponding to European Application No. EP 13787073, May 27, 2015.

Ghosh, Zhang, Andrews, Muhamed: "Fundamentals of LTE", Aug. 1, 2010 (Aug. 1, 2010), Prentice Hall, Westerford, Massachusetts, USA, XP002740127.

\* cited by examiner

METHOD FOR INSTRUCTING CSI FEEDBACK SIGNALING CONFIGURATION AND BASE STATION

TECHNICAL FIELD

The disclosure relates to the field of communications, and in particular to a method for instructing CSI feedback signaling configuration and base station.

BACKGROUND

The long term evolution (LTE for short) system has experienced several versions of R8/9/110, and R11 technique is researched successively and accurately. Currently, some R8 products start to be commercially used gradually, while R9 and R10 are waiting for further product planning.

After experiencing R8 and R9 periods, a number of new characteristics are further added to R10 on the basis of the former two, such as pilot frequency characteristics of DMRS (demodulation reference signal) and CSI-RS (channel state information reference signal), transmission and feedback characteristics of 8-antenna support, and especially, the eICIC (enhanced inter-cell interference cancelling) technique further considers the inter-cell interference avoiding technique on the basis of considering R8/9 ICIC. The technique for solving the inter-cell interference problem mainly considers cell interference avoiding in a homogeneous network in the early R10 period, and the eICIC technique and CoMP (coordinated multi-point) technique are main streams. As the name implies, CoMP is that multiple nodes coordinate with one node or multiple UEs send data over the same time frequency resource or different time frequency resources. Such a technique may reduce inter-cell interference, improve the throughput rate of cell edges, and enlarge the coverage of cells. However, in late discussion, since the heterogeneous network is taken into consideration and more scenarios are introduced, and due to the complexity of the CoMP technique and the time limit of R10 discussion, it is finally decided not to introduce additional CoMP standardized contents in the R10 period; however, when a CSI-RS is designed, it may be designed considering some requirements of the CoMP. Thus, the CoMP technique is not further discussed after the 60 bis conference.

In LTE a PDCCH (physical downlink control channel) bears scheduling allocation and other control information are defined. Each PDCCH is formed by several CCEs (control channel elements), and the number of CCEs of each subframe is determined by the number of PDCCHs and downlink bandwidth.

UE obtains the PDCCH by performing blind detection in a search space. The search space is divided into a common search space and a UE-specific search space. The common search space refers to a region where all the UEs may search, and this space carries cell-specific information. The specific search space refers to a space range where a single UE may search, and specific search spaces of multiple UEs may be overlapped, but generally only the initial search positions are different. Before the blind detection, higher layer signalling notifies the UE a work pattern and a radio network temporary identity (RNTI for short) type used for PDCCH cyclic redundancy check (CRC for short) scrambling.

Please see table 1 for the relationships among the search space $S_k^{(L)}$ and an aggregation level L and the number $M^{(L)}$ of candidate PDCCHs. The aggregation level is the number of CCEs occupied by the PDCCHs. When blind detection is performed in a UE-specific search space, a user equipment first calculates an initial blind detection position $Y_k$ according to UE identification (UE ID), a subframe number, etc., then performs detection in the search space, until a PDCCH allocated to the user equipment is detected.

TABLE 1

PDCCH candidate set

| | Search space $S_k^{(L)}$ | | Number of candidate PDCCHs $M^{(L)}$ |
|---|---|---|---|
| Type | Aggregation level L | Size [number of CCEs] | |
| UE specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Please see table 2 for the corresponding relationship between the relative positions of the aggregation level and the first control channel element of the PDCCH in the UE-specific search space. The relative position of the first control channel element of the PDCCH in the UE-specific search space refers to the relative position of a first CCE index nCCE occupied by the PDCCH with respect to the initial blind detection position $Y_k$, and nCCE, offset are used for representation in this text. nCCE, offset=nCCE-$Y_k$, and the value range of nCCE, offset is 0-6, 8, 10. As shown in table 2, it is a schematic diagram of a possible first CCE position and an aggregation level corresponding thereto in the UE-specific search space.

TABLE 2

Corresponding relationship between aggregation level and first CCE position

| Aggregation level | Relative position of the first CCE in the UE-specific search space |
|---|---|
| L = 1 | nCCE, offset = 0/1/2/3/4/5 |
| L = 2 | nCCE, offset = 0/2/4/6/8/10 |
| L = 3 | nCCE, offset = 0/4 |
| L = 4 | nCCE, offset = 0/8 |

In the latest 68 bis conference discussion process, feedback and interference definition assumptions are discussed in detail. Currently, the main view is to respectively conduct researches on channel measurement and interference measurement and channel measurement and interference are configured independently, and aggregation feedback of different CSI-RS resources may be supported, wherein the aggregation feedback comprises aggregation PMI feedback and aggregation CQI feedback. In addition, the overhead of feedback and that downlink control signaling and the size of a CoMP measurement set is relevant are considered; therefore, it is necessary to firstly discuss and limit the size of the CoMP measurement set, such that the feedback and downlink control signaling may acquire further discussion convergence. According to the 68 bis conference and offline discussion, it is primarily defined that the size of the CoMP measurement set is not greater than 2 or 3 at maximum, such that appropriate convergence may be performed on further feedback and control signaling researches.

With regard to the problem of how to configure the terminal side to feed back CSI required by the base station side in the related art, there is still no effective solution proposed currently.

SUMMARY

The present invention provides a feedback signaling instruction configuration method and base station to at least solve the problem of how to configure the terminal side to feed back CSI required by the base station side mentioned above. The CSI of different aggregation modes and/or interference assumptions of CSI-RS resources may be multiple pieces of CSI in one carrier and may also be multiple pieces of CSI in multiple carriers.

According to one aspect of the present invention, a method for instructing CSI feedback signaling configuration is provided, comprising: a base station side notifies a terminal side, via the first higher layer signaling of a UE-Specific, a CSI-RS resource for measuring CSI, the CSI-RS resource comprising at least one of the time frequency position of the CSI-RS resource in a subframe, the aerial port number configuration of the CSI-RS resource, the period of the CSI-RS resource and subframe offset, the sequence identifier of the CSI-RS resource, and the power control information of the CSI-RS resource; the base station side instructs the terminal side to feed back the CSI corresponding to the CSI-RS resource.

Preferably, before the step of the terminal side feeding back corresponding CSI according to a CSI-RS resource, the method further comprises: the base station side notifying the terminal side, via the second higher layer signaling of the UE-Specific, a candidate configuration set of CSI needing to be fed back in multiple CSI-RS resources.

Preferably, the step of the base station side notifying the terminal side, via the second higher layer signaling of the UE-Specific, a candidate configuration set of CSI needing to be fed back in multiple CSI-RS resources comprises: the base station side using a bitmap to notify the terminal side the candidate configuration set, wherein the length of the bitmap is 3 or 4 or 7 or 8 respectively corresponding to different aggregation and/or interference assumption modes of CSI, and each bit in the bitmap corresponds to a different aggregation and/or interference assumption measurement feedback mode of CSI-RS resources configured.

Preferably, the step of the base station side instructs the terminal side to feed back the CSI corresponding to the CSI-RS resource comprises: the base station side dynamically instructing the terminal to select and feedback corresponding CSI via feedback triggering signaling bits in DCI Format 0 or DCI format 4 or a random access response or uplink scheduling grant signaling, and/or the base station side dynamically instructing the terminal to select and feedback corresponding CSI via a resource position where DCI Format 0 or DCI format 4 or a random access response or uplink scheduling grant signaling which belongs to the terminal and is blindly detected by the terminal side is located, wherein the CSI-RS resource comprises a CSI-RS resource for measuring CSI of which the terminal side is notified via the first higher layer signaling or a candidate configuration side of which the terminal side is notified via the second higher layer signaling.

Preferably, the resource position where DCI format 4 or a random access response or uplink scheduling grant signaling is located comprises at least one of: the starting position of a corresponding CCE, a corresponding aggregation level, a corresponding subframe number and a corresponding system frame number and a region instruction of a corresponding higher layer signaling configuration.

Preferably, when the number of the CSI-RS resources is 1, the feedback triggering signaling bit of DCI Format 0 or DCI format 4 or the random access response or uplink scheduling grant signaling is 1 bit, where 0 represents not triggering CSI of the CSI-RS resource, and 1 represents triggering the CSI of the CSI-RS resource.

Preferably, when the number of the CSI-RS resources is 2 or 3, the feedback triggering signaling bits in DCI Format 0 or DCI format 4 or a random access response or uplink scheduling grant signaling are 2 bits, where 00 represents not triggering CSI of any one of CSI-RS resources, and 01-11 respectively represent triggering CSI of different aggregation modes and/or interference assumptions of the CSI-RS resource.

Preferably, when the number of the CSI-RS resources is 2 or 3, the feedback triggering signaling bit of DCI Format 0 or DCI format 4 or the random access response or uplink scheduling grant signaling is 1 bit, and the terminal side is instructed, via the resource position where DCI Format 0 or DCI format 4 or the random access response or uplink scheduling grant signaling is located and the feedback triggering signaling 1 bit, to feed back CSI of different aggregation modes and/or interference assumptions of the CSI-RS resources.

Preferably, when the number of the CSI-RS resources is 2 or 3, the terminal side is instructed, via the resource position where DCI Format 0 or DCI format 4 or the random access response or uplink scheduling grant signaling is located, to feed back CSI of different aggregation modes and/or interference assumptions of the CSI-RS resources.

Preferably, when the number of the CSI-RS resources is 2 or 3, the base station side notifies the terminal side, via the second higher layer signaling of the UE-Specific, N pieces of candidate CSI of different aggregation modes and/or interference assumptions of the CSI-RS resources, where N>0; and the terminal side is instructed, via the resource position where DCI Format 0 or DCI format 4 or the random access response or uplink scheduling grant signaling is located, to feed back CSI of different aggregation modes and/or interference assumptions of the CSI-RS resources.

Preferably, when the number of the CSI-RS resources is 2 or 3, the base station 2o side notifies the terminal side, via the second higher layer signaling of the UE-Specific, N pieces of candidate CSI of different aggregation modes and/or interference assumptions of the CSI-RS resources, where N>0; and the terminal side is instructed, via the feedback triggering signaling in DCI Format 0 or DCI format 4 or the random access response or uplink scheduling grant signaling, to feed back CSI of different aggregation modes and/or interference assumptions of the CSI-RS resources.

Preferably, when the number of the CSI-RS resources is 2 or 3, the base station side notifies the terminal side, via the second higher layer signaling of the UE-Specific, N pieces of candidate CSI of different aggregation modes and/or interference assumptions of the CSI-RS resources, where N>0; and the terminal side is instructed, via the feedback triggering signaling in DCI Format 0 or DCI format 4 or the random access response or uplink scheduling grant signaling, and via the resource position where DCI Format 0 or DCI format 4 or the random access response or uplink scheduling grant signaling is located, to feed back CSI of different aggregation modes and/or interference assumptions of the CSI-RS resources.

According to another aspect of the present invention, a base station is provided, comprising: a first notification module, configured to notify a terminal side, via the first higher layer signaling of a UE-Specific, a CSI-RS resource for measuring CSI, the CSI-RS resource comprising at least one of: the time frequency position of the CSI-RS resource in a subframe, the aerial port number configuration of the CSI-RS resource, the period of the CSI-RS resource and subframe offset, the sequence identifier of the CSI-RS resource, and the power control information of the CSI-RS resource; and an instruction module, configured to instruct the terminal side to feed back the CSI corresponding to the CSI-RS resource.

Preferably, the base station further includes: a second notification module, configured to notify, when the CSI-RS resources are multiple, the terminal side, via the second higher layer signaling of the UE-Specific, a candidate configuration set of CSI needing to be fed back in the multiple CSI-RS resources.

Preferably, the second notification module includes: a candidate notification sub-module, configured to notify the terminal side the candidate configuration set via a bitmap, wherein the length of the bitmap is 3 or 4 or 7 or 8, and each bit in the bitmap corresponds to a different aggregation and/or interference assumption measurement feedback mode of CSI-RS resources configured.

Preferably, the instruction module includes: a dynamic instruction sub-module, configured to dynamically instruct the terminal, via feedback triggering signaling bits in DCI Format 0 or DCI format 4 or a random access response or uplink scheduling grant signaling, and/or via a resource position where DCI Format 0 or DCI format 4 or a random access response or uplink scheduling grant signaling which belongs to the terminal and is blindly detected by the terminal side is located, to select and feedback corresponding CSI.

In the present invention, the base station side flexibly configures the terminal side to feed back various kinds of CSI information, thus enabling the base station side to flexibly and dynamically acquire the CSI, and in turn realizing precise link self-adaption and data transmission, and reducing the uplink feedback overhead and measurement complexity of the terminal side.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
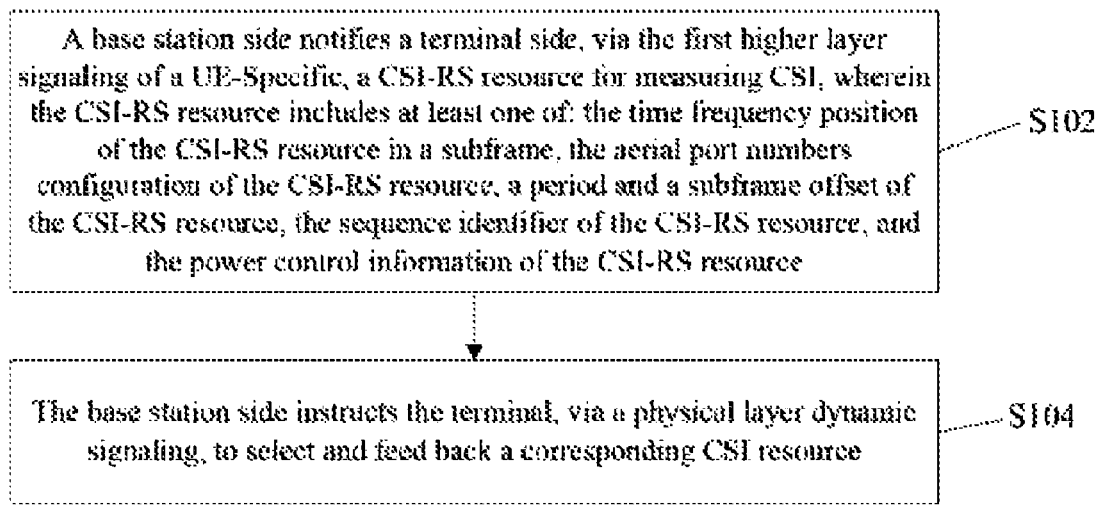
FIG. 1 is a flowchart of a method for instructing CSI feedback signaling configuration according to the embodiments of the present invention.

FIG. 1 is a flowchart of a method for instructing CSI feedback signaling configuration according to the embodiments of the present invention. As shown in FIG. 1, the method includes the following steps:

Step S102, a base station side notifies a terminal side, via the higher layer signaling of a UE-Specific, a CSI-RS resource for measuring CSI, the CSI-RS resource for measuring CSI comprising at least one of: the time frequency position of the corresponding CSI-RS resource in a subframe, the aerial port number configuration of the corresponding CSI-RS resource, the period of the corresponding CSI-RS resource and subframe offset, the sequence identifier of the corresponding CSI-RS resource, and the power control information of the corresponding CSI-RS resource.

Step S104, the base station side instructs the terminal, via a physical layer dynamic signaling, to select and feedback a corresponding CSI resource.

In the present embodiment, the base station side flexibly configures the terminal side to feed back various kinds of CSI information, thus enabling the base station side to flexibly and dynamically acquire the CSI, and in turn realizing precise link self-adaption and data transmission, and reducing the uplink feedback overhead and measurement complexity of the terminal side.

In the above-mentioned embodiment, CSI-RS resources for measuring CSI of which the terminal side is notified may be multiple sets. Where there are multiple sets of CSI-RS resources, before step S104, the base station side may also notify the terminal side, via the higher layer signaling of the UE-Specific, a candidate configuration set used for instructing the terminal side to feed back CSI which the base station requires the terminal to feed back (step S1022).

In step S102, notifying the terminal side, via the higher layer signaling of the UE-Specific, a candidate configuration set used for instructing the terminal side to feed back CSI which the base station requires the terminal to feed back may use a bitmap notification mode. The fixed bitmap length is 3 or 4 or 7 or 8, wherein each bit in the bitmap corresponds to a different aggregation and/or interference assumption measurement feedback mode of CSI-RS resources configured.

In step S104, dynamically instructing the terminal to select and feedback a corresponding CSI resource in the candidate set comprises: the base station side dynamically instructing the terminal, via feedback triggering signaling bits in DCI Format 0 or DCI format 4 or a random access response or uplink scheduling grant signaling, and/or via a resource position where DCI Format 0 or DCI format 4 or a random access response or uplink scheduling grant signaling which belongs to the terminal and is blindly detected by the terminal side is located, to select and feedback corresponding CSI.

The resource position where DCI Format 0 or DCI format 4 or a random access response or uplink scheduling grant signaling is located comprises at least one of: the starting position of a corresponding CCE, a corresponding aggregation level, a corresponding subframe number and a corresponding system frame number.

When the higher layer signaling of the UE-Specific notifies the terminal side that the number of CSI-RS resources for measuring CSI is 1, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. Dynamically instructing the terminal to select from the candidate set and feedback a corresponding CSI resource comprises that the feedback triggering signaling bit of DCI Format 0 or DCI format 4 or the random access response or uplink scheduling grant signaling is 1 bit, where 0 represents not triggering CSI of a CSI-RS resource of a higher layer configuration, and 1 represents triggering CSI of a CSI-RS resource of the higher layer configuration.

When the higher layer signaling of the UE-Specific notifies the terminal side that the number of CSI-RS resources for measuring CSI is 2, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. The candidate set is a CSI-RS resource measurement set of the terminal side of the higher layer signaling configuration, used for dynamically instructing the terminal to select from the candidate set and feedback a corresponding CSI resource comprises that the feedback triggering signaling bits of DCI Format 0 or DCI format 4 or the random access response or uplink scheduling grant signaling are 2 bits, where 00 represents not triggering CSI of any one of CSI-RS resources of a higher layer configuration, and 01-11 respectively represent triggering CSI of different aggregation modes and/or interference assumptions of the CSI-RS resources of the higher layer configuration.

When the higher layer signaling of the UE-Specific notifies the terminal side that the number of CSI-RS resources for measuring CSI is 2, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. The candidate set is a CSI-RS resource measurement set of the terminal side of the higher layer signaling configuration, used for dynamically instructing the terminal to select from the candidate set and feedback a corresponding CSI resource comprises that the feedback triggering signaling bit of DCI Format 0 or DCI format 4 or the random access response or uplink scheduling grant signaling is 1 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

When the higher layer signaling of the UE-Specific notifies the terminal side that the number of CSI-RS resources for measuring CSI is 2, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. The candidate set is a CSI-RS resource measurement set of the terminal side of the higher layer signaling configuration, used for dynamically instructing the terminal to select from the candidate set and feedback a corresponding CSI resource comprises determining to feed back CSI of different aggregation modes and/or interference assumptions of the CSI-RS resources via the resource position where DCI Format 0 or DCI format 4 or a random access response or uplink scheduling grant signaling is located.

When the higher layer signaling of the UE-Specific notifies the terminal side that the number of CSI-RS resources for measuring CSI is 2, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 2 CSI-RS resources. Dynamically instructing the terminal to select from the candidate set and feedback a corresponding CSI resource comprises determining to feed back CSI of different aggregation modes and/or interference assumptions of the CSI-RS resources via the resource position where DCI Format 0 or DCI format 4 or a random access response or uplink scheduling grant signaling is located.

When the higher layer signaling of the UE-Specific notifies the terminal side that the number of CSI-RS resources for measuring CSI is 2, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 2 CSI-RS resources. Dynamically instructing the terminal to select from the candidate set and feedback a corresponding CSI resource comprises that the feedback triggering signaling bits of DCI Format 0 or DCI format 4 or the random access response or uplink scheduling grant signaling are 2 bits, where 00 represents not triggering CSI of any one of CSI-RS resources of the candidate set of a higher layer configuration, and 01-11 respectively represent triggering CSI of different aggregation modes and/or interference assumptions of the CSI-RS resources of the candidate set of the higher layer configuration.

When the higher layer signaling of the UE-Specific notifies the terminal side that the number of CSI-RS resources for measuring CSI is 2, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 2 CSI-RS resources. Dynamically instructing the terminal to select from the candidate set and feedback a corresponding CSI resource comprises that the feedback triggering signaling bit of DCI Format 0 or DCI format 4 or the random access response or uplink scheduling grant signaling is 1 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

When the higher layer signaling of the UE-Specific notifies the terminal side that the number of CSI-RS resources for measuring CSI is 3, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. The candidate set is a CSI-RS resource measurement set of the terminal side of the higher layer signaling configuration, used for dynamically instructing the terminal to select from the candidate set and feedback a corresponding CSI resource comprises that the feedback triggering signaling bit of DCI Format 0 or DCI format 4 or the random access response or uplink scheduling grant signaling is 1 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

When the higher layer signaling of the UE-Specific notifies the terminal side that the number of CSI-RS resources for measuring CSI is 3, notifying the terminal side, via the higher layer signaling of the UE-Specific, a candidate configuration set used for instructing the terminal side to feed back CSI which the base station requires the terminal to feed back is not enabled, or the base station side does not require to configure corresponding higher layer signaling for the terminal side. The candidate set is a CSI-RS resource measurement set of the terminal side of the higher layer signaling configuration, used for dynamically instructing the terminal to select from the candidate set and feedback a corresponding CSI resource comprises that the feedback triggering signaling bit of DCI Format 0 or DCI format 4 or the random access response or uplink scheduling grant signaling is 2 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

When the higher layer signaling of the UE-Specific notifies the terminal side that the number of CSI-RS resources for measuring CSI is 3, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 3 CSI-RS resources. Dynamically instructing the terminal to select from the candidate set and feedback a corresponding CSI resource comprises that the feedback triggering signaling bits of DCI Format 0 or DCI format 4 or the random access response or uplink scheduling grant signaling are 1 bits, where 0 represents not triggering CSI of any one of CSI-RS resources of the candidate set of a higher layer configuration, and 1 represents triggering CSI of different aggregation modes and/or interference assumptions of the CSI-RS resources of the candidate set of the higher layer configuration.

When the higher layer signaling of the UE-Specific notifies the terminal side that the number of CSI-RS resources for measuring CSI is 3, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 3 CSI-RS resources. Dynamically instructing the terminal to select from the candidate set and feedback a corresponding CSI resource comprises that the feedback triggering signaling bits of DCI Format 0 or DCI format 4 or the random access response or uplink scheduling grant signaling are 1 bits, where 0 represents not triggering CSI of any one of CSI-RS resources of the candidate set of a higher layer configuration, and 1 represents triggering CSI of different aggregation modes and/or interference assumptions of the CSI-RS resources of the candidate set of the higher layer configuration.

When the higher layer signaling of the UE-Specific notifies the terminal side that the number of CSI-RS resources for measuring CSI is 3, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 3 CSI-RS resources. Dynamically instructing the terminal to select from the candidate set and feedback a corresponding CSI resource comprises that the feedback triggering signaling bits of DCI Format 0 or DCI format 4 or the random access response or uplink scheduling grant signaling are 2 bits, where 00 represents not triggering CSI of any one of CSI-RS resources of the candidate set of a higher layer configuration, and 01-11 respectively represent triggering CSI of different aggregation modes and/or interference assumptions of the CSI-RS resources of the candidate set of the higher layer configuration.

When the higher layer signaling of the UE-Specific notifies the terminal side that the number of CSI-RS resources for measuring CSI is 3, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 3 CSI-RS resources. Dynamically instructing the terminal to select from the candidate set and feedback a corresponding CSI resource comprises that the feedback triggering signaling bit of DCI Format 0 or DCI format 4 or the random access response or uplink scheduling grant signaling is 1 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

When the higher layer signaling of the UE-Specific notifies the terminal side that the number of CSI-RS resources for measuring CSI is 3, the terminal side is notified, via the higher layer signaling of the UE-Specific, of a candidate configuration set used for instructing the terminal side to feed back CSI which the base station requires the terminal to feed back and the UE is notified of candidate CSI of different aggregation modes and/or interference assumptions of the 3 CSI-RS resources. Dynamically instructing the terminal to select from the candidate set and feedback a corresponding CSI resource comprises that the feedback triggering signaling bit of DCI Format 0 or DCI format 4 or the random access response or uplink scheduling grant signaling is 2 bit; in addition, the resource position where DCI Format 0 or DCI format 4 or a random access response or uplink scheduling grant signaling is located needs to be taken into consideration to determine to feed back CSI of different aggregation modes and/or interference assumptions of the CSI-RS resources.

The different aggregation modes in the above-mentioned embodiment refer to at least includes one of: whether the CSI feedback is triggered or not, selection and feedback of different CSI, and selection and feedback of different CSI combinations or aggregations. The DCI Format 0 or DCI format 4 or random access response or uplink scheduling grant signaling in the above-mentioned embodiment respectively refers to DCI Format 0 or DCI format 4 or a random access response or uplink scheduling grant signaling including terminal feedback triggering signaling.

Figure 2:
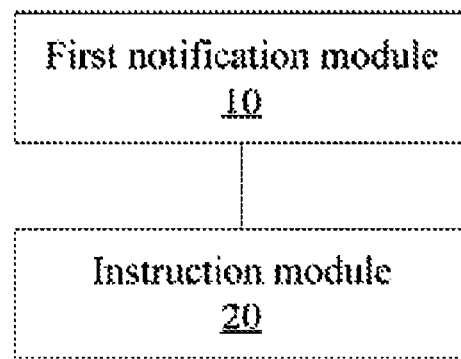
FIG. 2 is a structural block diagram of a base station for instructing and configuring CSI according to the embodiments of the present invention.

FIG. 2 is a structural block diagram of a base station for instructing and configuring CSI according to the embodiments of the present invention. As shown in FIG. 2, the base station includes: a first notification module 10, configured to notify a terminal side, via the first higher layer signaling of a UE-Specific, a CSI-RS resource for measuring CSI; and an instruction module 20, configured to instruct the terminal side to feed back the CSI corresponding to the CSI-RS resource. The first notification module 10 and the instruction module 20 are coupled.

In the present embodiment, the base station side flexibly configures the terminal side to feed back various kinds of CSI information, thus enabling the base station side to flexibly and dynamically acquire the CSI, and in turn realizing precise link self-adaption and data transmission, and reducing the uplink feedback overhead and measurement complexity of the terminal side.

The base station further includes: a second notification module 30, configured to notify, when the CSI-RS resources are multiple, the terminal side, via the second higher layer signaling of the UE-Specific, a candidate configuration set of CSI needing to be fed back in the multiple CSI-RS resources.

The second notification module 30 includes: a candidate notification sub-module, configured to notify the terminal side the candidate configuration set via a bitmap, wherein the length of the bitmap is 3 or 4 or 7 or 8, and each bit in the bitmap corresponds to a different aggregation and/or interference assumption measurement feedback mode of CSI-RS resources configured.

The instruction module 20 includes: a dynamic instruction sub-module, configured to dynamically instruct the terminal, via feedback triggering signaling bits in DCI Format 0 or DCI format 4 or a random access response or uplink scheduling grant signaling, and/or via a resource position where DCI Format 0 or DCI format 4 or a random access response or uplink scheduling grant signaling which belongs to the terminal and is blindly detected by the terminal side is located, to select and feedback corresponding CSI.

Embodiment 1

In this embodiment, assuming that a UE1 is a user of R11 or of a more advanced version, a base station side notifies the UE1, via the higher layer signaling of a UE-Specific, a set of CSI-RS resources for measuring CSI. When the higher layer signaling of the UE-Specific notifies the UE1 a set of CSI-RS resources for measuring CSI, the base station side does not need to configure corresponding higher layer signaling for the terminal side. A candidate set is a set of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of a CSI-RS resource of a higher layer configuration, and 1 represents triggering CSI of a CSI-RS resource of the higher layer configuration.

Embodiment 2

In this embodiment, assuming that a UE1 is a user of R11 or of a more advanced version, a base station side notifies the UE1, via the higher layer signaling of a UE-Specific, a set of CSI-RS resources for measuring CSI. When the higher layer signaling of the UE-Specific notifies the UE1 a set of CSI-RS resources for measuring CSI, the base station side does not need to configure corresponding higher layer signaling for the terminal side. A candidate set is a set of CSI-RS resources for measuring CSI configured by the base station side; in addition, via 2 bits of the feedback triggering signaling bits in DCI Format 0 or DCI format 4 or a random access response or uplink scheduling grant signaling, the base station side triggers the UE1 whether to feed back CSI of a corresponding CSI-RS resource, where 00 represents not triggering CSI of a CSI-RS resource of a higher layer configuration; 01 represents triggering to feed back CSI calculated by combining a CSI-RS resource of the higher layer configuration and a first IMR; 10 represents triggering to feed back CSI calculated by combining a CSI-RS resource of the higher layer configuration and a second IMR (interference measurement resource); and 11 reserves or represents triggering to feed back CSI calculated by combining a CSI-RS resource of the higher layer configuration and a third IMR.

Embodiment 3

In this embodiment, assuming that a UE1 is a user of R11 or of a more advanced version, a base station side notifies the UE, via the higher layer signaling of a UE-Specific, a set of CSI-RS resources for measuring CSI. When the higher layer signaling of the UE-Specific notifies the UE a set of CSI-RS resources for measuring CSI, the base station side does not need to configure corresponding higher layer signaling for the terminal side. A candidate set is a set of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of a CSI-RS resource of a higher layer configuration, and 1 represents triggering to feed back CSI calculated by combining a CSI-RS resource of the higher layer configuration and Nth (N>0) IMR; moreover, a resource position where DCI Format 0 or DCI format 4 or a random access response or uplink scheduling grant signaling is located is used to determine to feed back CSI of different aggregation modes and/or interference assumptions of CSI-RS resources. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI calculated by combining a CSI-RS resource of the higher layer configuration and a first IMR is selected and fed back; and when the aggregation level L=1, nCCE, offset=1/3/5 or L=2, nCCE, offset=2/6/10 or L=3, nCCE, offset=4 or L=4, nCCE, offset=8, CSI calculated by combining a CSI-RS resource of the higher layer configuration and a second IMR is selected and fed back.

Embodiment 4

In this embodiment, assuming that a UE1 is a user of R11 or of a more advanced version, a base station side notifies the UE1, via the higher layer signaling of a UE-Specific, a set of CSI-RS resources for measuring CSI. When the higher layer signaling of the UE-Specific notifies the UE1 a set of CSI-RS resources for measuring CSI, the base station side does not need to configure corresponding higher layer signaling for the terminal side. A candidate set is a set of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of a CSI-RS resource of a higher layer configuration, and 1 represents triggering to feed back CSI calculated by combining a CSI-RS resource of the higher layer configuration and Nth (N>0) IMR; moreover, a resource position where DCI Format 0 or DCI format 4 or a random access response or uplink scheduling grant signaling is located is used to determine to feed back CSI of different aggregation modes and/or interference assumptions of CSI-RS resources. If a subframe where DCI Format 0 or DCI format 4 or the random access response or uplink scheduling grant signaling is located is an even number of subframe, CSI calculated by combining a CSI-RS resource of the higher layer configuration and a first IMR is selected and fed back; and if a subframe where DCI Format 0 or DCI format 4 or the random access response or uplink scheduling grant signaling is located is an odd number of subframe, CSI calculated by combining a CSI-RS resource of the higher layer configuration and a second IMR is selected and fed back.

Embodiment 5

In this embodiment, assuming that a UE1 is a user of R11 or of a more advanced version, a base station side notifies the UE1, via the higher layer signaling of a UE-Specific, a set of CSI-RS resources for measuring CSI. When the higher layer signaling of the UE-Specific notifies the UE1 a set of CSI-RS resources for measuring CSI, the base station side does not need to configure corresponding higher layer signaling for the terminal side. A candidate set is a set of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of a CSI-RS resource of a higher layer configuration, and 1 represents triggering to feed back CSI calculated by combining a CSI-RS resource of the higher layer configuration and Nth (N>0) IMR; moreover, a resource position where DCI Format 0 or DCI format 4 or a random access response or uplink scheduling grant signaling is located is used to determine to feed back CSI of different aggregation modes and/or interference assumptions of CSI-RS resources. If a subframe where DCI Format 0 or DCI format 4 or the random access response or uplink scheduling grant signaling is located is an even number of system frame, CSI calculated by combining a CSI-RS resource of the higher layer configuration and a first IMR is selected and fed back; and if a subframe where DCI Format 0 or DCI format 4 or the random access response or uplink scheduling grant signaling is located is an odd number of system frame, CSI calculated by combining a CSI-RS resource of the higher layer configuration and a second IMR is selected and fed back.

Embodiment 6

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering CSI of two sets of CSI-RS resources of the higher layer configuration.

Embodiment 7

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of all the possible aggregation modes and/or interference assumptions of two sets of CSI-RS resources of the higher layer configuration.

Embodiment 8

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of aggregation modes and/or interference assumptions of two sets of CSI-RS resources of the higher layer configuration. which CSI of aggregation modes and/or interference assumptions should be fed back is determined by a resource position of DCI Format 0 or DCI format 4 or a random access response or uplink scheduling grant signaling. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI of a first aggregation mode and/or interference assumption of a higher layer configuration is selected and fed back; and when the aggregation level L=1, nCCE, offset=1/3/5 or L=2, nCCE, offset=2/6/10 or L=3, nCCE, offset=4 or L=4, nCCE, offset=8, CSI of a second aggregation mode and/or interference assumption of the higher layer configuration is selected and fed back.

Embodiment 9

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of aggregation modes and/or interference assumptions of two sets of CSI-RS resources of the higher layer configuration, which CSI of aggregation modes and/or interference assumptions should be fed back is determined by a resource position of DCI Format 0 or DCI format 4 or a random access response or uplink scheduling grant signaling. If a subframe where DCI Format 0 or DCI format 4 or the random access response or uplink scheduling grant signaling is located is an even number of system frame, CSI of a first aggregation mode and/or interference assumption of a higher layer configuration is selected and fed back; and if a subframe where DCI Format 0 or DCI format 4 or the random access response or uplink scheduling grant signaling is located is an odd number of system frame, CSI of a second aggregation mode and/or interference assumption of the higher layer configuration is selected and fed back.

Embodiment 10

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of aggregation modes and/or interference assumptions of two sets of CSI-RS resources of the higher layer configuration, which CSI feedback of aggregation modes and/or interference assumptions should be performed is determined by a resource position of DCI Format 0 or DCI format 4 or a random access response or uplink scheduling grant signaling. If a subframe where DCI Format 0 or DCI format 4 or the random access response or uplink scheduling grant signaling is located is an even number of subframe, CSI of a first aggregation mode and/or interference assumption of a higher layer configuration is selected and fed back; and if a subframe where DCI Format 0 or DCI format 4 or the random access response or uplink scheduling grant signaling is located is an odd number of subframe, CSI of a second aggregation mode and/or interference assumption of the higher layer configuration is selected and fed back.

Embodiment 11

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 2 bits of the feedback triggering signaling bits in DCI Format 0 or DCI format 4 or a random access response or uplink scheduling grant signaling, the base station side triggers the UE1 whether to feed back CSI of a corresponding CSI-RS resource, where 00 represents not triggering CSI of two sets of CSI-RS resources of a higher layer configuration; 01 represents triggering a first aggregation mode and/or interference measurement mode of CSI of two sets of CSI-RS resources of the higher layer configuration; 10 represents triggering a second aggregation mode and/or interference measurement mode of CSI of two sets of CSI-RS resources of the higher layer configuration; and 11 represents triggering a third aggregation mode and/or interference measurement mode of CSI of two sets of CSI-RS resources of the higher layer configuration.

Embodiment 12

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 2 bits of the feedback triggering signaling bits in DCI Format 0 or DCI format 4 or a random access response or uplink scheduling grant signaling, the base station side triggers the UE1 whether to feed back CSI of a corresponding CSI-RS resource, where 00 represents not triggering CSI of two sets of CSI-RS resources of a higher layer configuration; 01 represents triggering first and second aggregation modes and/or interference measurement modes of CSI of two sets of CSI-RS resources of the higher layer configuration; 10 represents triggering third and fourth aggregation modes and/or interference measurement modes of CSI of two sets of CSI-RS resources of the higher layer configuration; and 11 represents triggering fifth and sixth aggregation modes and/or interference measurement modes of CSI of two sets of CSI-RS resources of the higher layer configuration In addition, the need of selecting and feeding back one aggregation mode and/or interference measurement mode of CSI from every two aggregation modes and/or interference measurement modes may be determined by CSI of aggregations modes and/or interference assumptions via a resource position where DCI Format 0 or DCI format 4 or a random access response or uplink scheduling grant signaling is located. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI of a first aggregation mode and/or interference assumption of a higher layer configuration is selected and fed back; and when the aggregation level L=1, nCCE, offset=1/3/5 or L=2, nCCE, offset=2/6/10 or L=3, nCCE, offset=4 or L=4, nCCE, offset=8, CSI of a second aggregation mode and/or interference assumption of the higher layer configuration is selected and fed back.

Embodiment 13

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 2 bits of the feedback triggering signaling bits in DCI Format 0 or DCI format 4 or a random access response or uplink scheduling grant signaling, the base station side triggers the UE1 whether to feed back CSI of a corresponding CSI-RS resource, where 00 represents not triggering CSI of two sets of CSI-RS resources of a higher layer configuration; 01 represents triggering first and second aggregation modes and/or interference measurement modes of CSI of two sets of CSI-RS resources of the higher layer configuration; 10 represents triggering third and fourth aggregation modes and/or interference measurement modes of CSI of two sets of CSI-RS resources of the higher layer configuration; and 11 represents triggering fifth and sixth aggregation modes and/or interference measurement modes of CSI of two sets of CSI-RS resources of the higher layer configuration In addition, the need of selecting and feeding back one aggregation mode and/or interference measurement mode of CSI from every two aggregation modes and/or interference measurement modes may be determined by CSI of aggregations modes and/or interference assumptions via a resource position where DCI Format 0 or DCI format 4 or a random access response or uplink scheduling grant signaling is located. If a subframe where DCI Format 0 or DCI format 4 or the random access response or uplink scheduling grant signaling is located is an even number of subframe, CSI of a first aggregation mode and/or interference assumption of a higher layer configuration is selected and fed back; and if a subframe where DCI Format 0 or DCI format 4 or the random access response or uplink scheduling grant signaling is located is an odd number of subframe, CSI of a second aggregation mode and/or interference assumption of the higher layer configuration is selected and fed back.

Embodiment 14

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side does not need to configure corresponding higher layer signaling for the terminal side. A candidate set is two sets of CSI-RS resources for measuring CSI configured by the base station side; in addition, via 2 bits of the feedback triggering signaling bits in DCI Format 0 or DCI format 4 or a random access response or uplink scheduling grant signaling, the base station side triggers the UE1 whether to feed back CSI of a corresponding CSI-RS resource, where 00 represents not triggering CSI of two sets of CSI-RS resources of a higher layer configuration; 01 represents triggering first and second aggregation modes and/or interference measurement modes of CSI of two sets of CSI-RS resources of the higher layer configuration; 10 represents triggering third and fourth aggregation modes and/or interference measurement modes of CSI of two sets of CSI-RS resources of the higher layer configuration; and 11 represents triggering fifth and sixth aggregation modes and/or interference measurement modes of CSI of two sets of CSI-RS resources of the higher layer configuration In addition, the need of selecting and feeding back one aggregation mode and/or interference measurement mode of CSI from every two aggregation modes and/or interference measurement modes may be determined by CSI of aggregations modes and/or interference assumptions via a resource position where DCI Format 0 or DCI format 4 or a random access response or uplink scheduling grant signaling is located. If a subframe where DCI Format 0 or DCI format 4 or the random access response or uplink scheduling grant signaling is located is an even number of system frame, CSI of a first aggregation mode and/or interference assumption of a higher layer configuration is selected and fed back; and if a subframe where DCI Format 0 or DCI format 4 or the random access response or uplink scheduling grant signaling is located is an odd number of system frame, CSI of a second aggregation mode and/or interference assumption of the higher layer configuration is selected and fed back.

Embodiment 15

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side configures corresponding CSI feedback limit set higher layer signaling, i.e. a candidate set at the terminal side. The candidate set may be in the following definition manner: Trigger resource 1 (x y).

The first bit represents x representing whether to feed back CSI of a first CSI-RS resource configured; the second bit represents y representing whether to feed back CSI of a second CSI-RS resource configured; 0 represents not feeding back corresponding CSI; and 1 represents feeding back corresponding CSI. If x and y are equal to 1 at the same time, then aggregated CSI of the first CSI-RS resource and the second CSI-RS resource needs to be fed back.

Via 1 bit of the feedback triggering signaling bit in DCI Format 0 or DCI format 4 or a random access response or uplink scheduling grant signaling, the base station side triggers the UE1 whether to feed back CSI of a CSI-RS resource in the candidate set, where 0 represents not triggering to feed back CSI of a CSI-RS resource in the candidate set, and 1 represents triggering CSI of a CSI-RS resource in the candidate set.

Embodiment 16

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side configures corresponding CSI feedback limit set higher layer signaling, i.e. a candidate set at the terminal side. The candidate set may be in the following definition manner:

Trigger resource 1 (x y z)

The first bit x represents whether to feed back CSI of a first CSI-RS resource configured; the second bit y represents whether to feed back CSI of a second CSI-RS resource configured; the third bit z represents whether to feed back aggregated CSI of the first CSI-RS resource and the second CSI-RS resource; 0 represents not feeding back corresponding CSI; and 1 represents feeding back corresponding CSI.

Via 1 bit of the feedback triggering signaling bit in DCI Format 0 or DCI format 4 or a random access response or uplink scheduling grant signaling, the base station side triggers the UE1 whether to feed back CSI of a CSI-RS resource in the candidate set, where 0 represents not triggering to feed back CSI of a CSI-RS resource in the candidate set, and 1 represents triggering CSI of a CSI-RS resource in the candidate set. Bits in different Trigger resources may represent different IMR assumption conditions of the same or different CSI-RS resources.

Embodiment 17

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1)
Trigger resource 2 (x2 y2 z2)
Trigger resource 3 (x3 y3 z3)

The first bit xn represents whether to feed back CSI of a first CSI-RS resource configured; the second bit yn represents whether to feed back CSI of a second CSI-RS resource configured; the third bit zn represents whether to feed back aggregated CSI of the first CSI-RS resource and the second CSI-RS resource; 0 represents not feeding back corresponding CSI; and 1 represents feeding back corresponding CSI. Bits in different Trigger resources may represent different IMR assumption conditions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 in the candidate set; 10 represents triggering CSI of Trigger resource 2 in the candidate set; and 11 represents triggering CSI of Trigger resource 3 in the candidate set.

Embodiment 18

In this embodiment, assuming that a UE1 is a user of R11 or of a more advanced version, a base station side notifies the UE1, via the higher layer signaling of a UE-Specific, two sets of CSI-RS resources for measuring CSI. When the higher layer signaling of the UE-Specific notifies the UE1 two sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1)
Trigger resource 2 (x2 y2 z2)
Trigger resource 3 (x3 y3 z3)
Trigger resource 4 (x4 y4 z4)
Trigger resource 5 (x5 y5 z5)
Trigger resource 6 (x6 y6 z6)

The first bit xn represents whether to feed back CSI of a first CSI-RS resource configured; the second bit yn represents whether to feed back CSI of a second CSI-RS resource configured; the third bit zn represents whether to feed back aggregated CSI of the first CSI-RS resource and the second CSI-RS resource; 0 represents not feeding back corresponding CSI; and 1 represents feeding back corresponding CSI. Bits in different Trigger resources may represent different IMR assumption conditions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 and Trigger resource 2 in the candidate set; 10 represents triggering CSI of Trigger resource 3 and Trigger resource 4 in the candidate set; and 11 represents triggering CSI of Trigger resource 5 and Trigger resource 6 in the candidate set.

In addition, the need of selecting and feeding back one aggregation mode and/or interference measurement mode of CSI from every two Trigger resources may be determined by CSI of aggregations modes and/or interference assumptions via a resource position where DCI Format 0 or DCI format 4 or a random access response or uplink scheduling grant signaling is located. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI of a first Trigger resource of a higher layer configuration is selected and fed back; and when the aggregation level L=1, nCCE, offset=1/3/5 or L=2, nCCE, offset=2/6/10 or L=3, nCCE, offset=4 or L=4, nCCE, offset=8, CS of a second Trigger resource of the higher layer configuration is selected and fed back.

Embodiment 19

Assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side does not need to configure corresponding higher layer signaling for the terminal side. A candidate set is three sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering CSI of two sets of CSI-RS resources of the higher layer configuration.

Embodiment 20

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side does not need to configure corresponding higher layer signaling for the terminal side. A candidate set is three sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of all the possible aggregation modes and/or interference assumptions of two sets of CSI-RS resources of the higher layer configuration.

Embodiment 21

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side does not need to configure corresponding higher layer signaling for the terminal side. A candidate set is three sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of three sets of CSI-RS resources of a higher layer configuration, and 1 represents triggering to feed back CSI of aggregation modes and/or interference assumptions of three sets of CSI-RS resources of the higher layer configuration, which CSI feedback of aggregation modes and/or interference assumptions should be performed is determined by a resource position of DCI Format 0 or DCI format 4 or a random access response or uplink scheduling grant signaling. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI of a first aggregation mode and/or interference assumption of a higher layer configuration is selected and fed back; and when the aggregation level L=1, nCCE, offset=1/3/5 or L=2, nCCE, offset=2/6/10 or L=3, nCCE, offset=4 or L=4, nCCE, offset=8, CSI of a second aggregation mode and/or interference assumption of the higher layer configuration is selected and fed back.

Embodiment 22

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side does not need to configure corresponding higher layer signaling for the terminal side. A candidate set is three sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of aggregation modes and/or interference assumptions of two sets of CSI-RS resources of the higher layer configuration, which CSI feedback of aggregation modes and/or interference assumptions should be performed is determined by a resource position of DCI Format 0 or DCI format 4 or a random access response or uplink scheduling grant signaling. If a subframe where DCI Format 0 or DCI format 4 or the random access response or uplink scheduling grant signaling is located is an even number of system frame, CSI of a first aggregation mode and/or interference assumption of a higher layer configuration is selected and fed back; and if a subframe where DCI Format 0 or DCI format 4 or the random access response or uplink scheduling grant signaling is located is an odd number of system frame, CSI of a second aggregation mode and/or interference assumption of the higher layer configuration is selected and fed back.

Embodiment 23

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side does not need to configure corresponding higher layer signaling for the terminal side. A candidate set is three sets of CSI-RS resources for measuring CSI configured by the base station side; in addition, via 1 bit of the feedback triggering signaling bit in DCI Format 0 or DCI format 4 or a random access response or uplink scheduling grant signaling, the base station side triggers the UE1 whether to feed back CSI of a corresponding CSI-RS resource, where 0 represents not triggering CSI of two sets of CSI-RS resources of a higher layer configuration, and 1 represents triggering to feed back CSI of aggregation modes and/or interference assumptions of two sets of CSI-RS resources of the higher layer configuration, which CSI of aggregation modes and/or interference assumptions should be fed back is determined by a resource position of DCI Format 0 or DCI format 4 or a random access response or uplink scheduling grant signaling. If a subframe where DCI Format 0 or DCI format 4 or the random access response or uplink scheduling grant signaling is located is an even number of subframe, CSI of a first aggregation mode and/or interference assumption of a higher layer configuration is selected and fed back; and if a subframe where DCI Format 0 or DCI format 4 or the random access response or uplink scheduling grant signaling is located is an odd number of subframe, CSI of a second aggregation mode and/or interference assumption of the higher layer configuration is selected and fed back.

Embodiment 24

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1)
Trigger resource 2 (x2 y2 z2)
Trigger resource 3 (x3 y3 z3)

The first bit xn represents whether to feed back CSI of a first CSI-RS resource configured; the second bit yn represents whether to feed back CSI of a second CSI-RS resource configured; the third bit zn represents whether to feed back CSI of a third CSI-RS resource configured; 0 represents not feeding back corresponding CSI; and 1 represents feeding back corresponding CSI. Where any two or three bits of the same Trigger resource are 1, it represents that the corresponding two or three CSI-RS resources need aggregated feedback. Bits in different Trigger resources may also represent different IMR assumption conditions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 in the candidate set; 10 represents triggering CSI of Trigger resource 2 in the candidate set; and 11 represents triggering CSI of Trigger resource 3 in the candidate set.

Embodiment 25

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side configures corresponding CSI feedback limit set higher layer signaling, i.e. a candidate set at the terminal side. The candidate set may be in the following definition manner:

Trigger resource 1 (x1 y1 z1)

The first bit xn represents whether to feed back CSI of a first CSI-RS resource configured; the second bit yn represents whether to feed back CSI of a second CSI-RS resource configured; the third bit zn represents whether to feed back CSI of a third CSI-RS resource configured; 0 represents not feeding back corresponding CSI; and 1 represents feeding back corresponding CSI. Where any two or three bits of the same Trigger resource are 1, it represents that the corresponding two or three CSI-RS resources need aggregated feedback. Bits in different Trigger resources may also represent different IMR assumption conditions of the same or different CSI-RS resources.

Via 1 bit of the feedback triggering signaling bit in DCI Format 0 or DCI format 4 or a random access response or uplink scheduling grant signaling, the base station side triggers the UE1 whether to feed back CSI of a CSI-RS resource in the candidate set, where 0 represents not triggering to feed back CSI of a CSI-RS resource in the candidate set, and 1 represents triggering CSI of Trigger resource 1 in the candidate set.

Embodiment 26

In this embodiment, assuming that a UE is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1 xx1 yy1 zz1 nn1)
Trigger resource 2 (x2 y2 z2 xx2 yy2 zz2 nn2)
Trigger resource 3 (x3 y3 z3 xx3 yy3 zz3 nn3)

The first bit xn represents whether to feed back CSI of a first CSI-RS resource configured; the second bit yn represents whether to feed back CSI of a second CSI-RS resource configured; the third bit zn represents whether to feed back CSI of a third CSI-RS resource configured; xxn, yyn, zzn, nnn (n=1, 2, 3) represents whether to feed back CSI of aggregations or interference assumptions of various combinations of the first CSI-RS resource, the second CSI-RS resource and the third CSI-RS resource; 0 represents not feeding back corresponding CSI; and 1 represents feeding back corresponding CSI. Bits in different Trigger resources may also represent different IMR assumptions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 in the candidate set; 10 represents triggering CSI of Trigger resource 2 in the candidate set; and 11 represents triggering CSI of Trigger resource 3 in the candidate set.

Embodiment 27

In this embodiment, assuming that a UE is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1 xx1 yy1 zz1 nn1)
Trigger resource 2 (x2 y2 z2 xx2 yy2 zz2 nn2)
Trigger resource 3 (x3 y3 z3 xx3 yy3 zz3 nn3)
Trigger resource 4 (x4 y4 z4 xx4 yy4 zz4 nn4)
Trigger resource 5 (x5 y5 z5 xx5 yy5 zz5 nn5)
Trigger resource 6 (x6 y6 z6 xx6 yy6 zz6 nn6)

The first bit xn represents whether to feed back CSI of a first CSI-RS resource configured; the second bit yn represents whether to feed back CSI of a second CSI-RS resource configured; the third bit zn represents whether to feed back CSI of a third CSI-RS resource configured; xxn, yyn, zzn, nnn (n=1, 2, 3, 4, 5, 6) represents whether to feed back CSI of aggregations or interference assumptions of various combinations of the first CSI-RS resource, the second CSI-RS resource and the third CSI-RS resource; 0 represents not feeding back corresponding CSI; and 1 represents feeding back corresponding CSI. Bits in different Trigger resources may also represent different IMR assumptions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 and Trigger resource 2 in the candidate set; 10 represents triggering CSI of Trigger resource 3 and Trigger resource 4 in the candidate set; and 11 represents triggering CSI of Trigger resource 5 and Trigger resource 6 in the candidate set.

In addition, the need of selecting and feeding back one aggregation mode and/or interference measurement mode of CSI from every two Trigger resources may be determined by CSI of aggregations modes and/or interference assumptions via a resource position where DCI Format 0 or DCI format 4 or a random access response or uplink scheduling grant signaling is located. If the initial CCE position of DCI Format 0 or DCI format 4 or the random access response or uplink scheduling grant signaling is nCCE, offset, and nCCE, offset is an offset CCE number of the actual DCI with respect to an initial blind detection position, when the aggregation level L=1, nCCE, offset=0/2/4 or L=2, nCCE, offset=0/4/8 or L=3, nCCE, offset=0 or L=4, nCCE, offset=0, CSI of a first Trigger resource of a higher layer configuration is selected and fed back; and when the aggregation level L=1, nCCE, offset=1/3/5 or L=2, nCCE, offset=2/6/10 or L=3, nCCE, offset=4 or L=4, nCCE, offset=8, CSI of a second Trigger resource of the higher layer configuration is selected and fed back.

Embodiment 28

In this embodiment, assuming that a UE1 is a user of R11 or of a more advanced version, a base station side notifies the UE1, via the higher layer signaling of a UE-Specific, three sets of CSI-RS resources for measuring CSI. When the higher layer signaling of the UE-Specific notifies the UE1 three sets of CSI-RS resources for measuring CSI, the base station side configures corresponding CSI feedback limit set higher layer signaling, i.e. a candidate set at the terminal side. The candidate set may be in the following definition manners:

Trigger resource 1 (x1 y1 z1 xx1 yy1 zz1 nn1)
Trigger resource 2 (x2 y2 z2 xx2 yy2 zz2 nn2)
Trigger resource 3 (x3 y3 z3 xx3 yy3 zz3 nn3)
Trigger resource 4 (x4 y4 z4 xx4 yy4 zz4 nn4)
Trigger resource 5 (x5 y5 z5 xx5 yy5 zz5 nn5)
Trigger resource 6 (x6 y6 z6 xx6 yy6 zz6 nn6)

The first bit xn represents whether to feed back CSI of a first CSI-RS resource configured; the second bit yn represents whether to feed back CSI of a second CSI-RS resource configured; the third bit zn represents whether to feed back CSI of a third CSI-RS resource configured; xxn, yyn, zzn, nnn (n=1, 2, 3, 4, 5, 6) represents whether to feed back CSI of aggregations or interference assumptions of various combinations of the first CSI-RS resource, the second CSI-RS resource and the third CSI-RS resource; 0 represents not feeding back corresponding CSI; and 1 represents feeding back corresponding CSI. Bits in different Trigger resources may also represent different IMR assumptions of the same or different CSI-RS resources.

Via 2 bits of the feedback triggering signaling bits in DCI Format 0 or DCI format 4 or a random access response or uplink scheduling grant signaling, the base station side triggers the UE1 whether to feed back CSI of a CSI-RS resource in the corresponding candidate set, where 00 represents not triggering to feed back CSI of a CSI-RS resource in the candidate set; 01 represents triggering CSI of Trigger resource 1 and Trigger resource 2 in the candidate set; 10 represents triggering CSI of Trigger resource 3 and Trigger resource 4 in the candidate set; and 11 represents triggering CSI of Trigger resource 5 and Trigger resource 6 in the candidate set.

In addition, the need of selecting and feeding back one aggregation mode and/or interference measurement mode of CSI from every two Trigger resources may be determined by CSI of aggregations modes and/or interference assumptions via a resource position where DCI Format 0 or DCI format 4 or a random access response or uplink scheduling grant signaling is located. If a subframe where DCI Format 0 or DCI format 4 or the random access response or uplink scheduling grant signaling is located is an even number of system frame, CSI of a first Trigger resource of a higher layer configuration is selected and fed back; and if a subframe where DCI Format 0 or DCI format 4 or the random access response or uplink scheduling grant signaling is located is an odd number of system frame, CSI of a second Trigger resource of the higher layer configuration is selected and fed back.

Embodiment 29

As regards embodiments 1-27, the base station side configures different measurement set sizes for the terminal side, i.e. different numbers of CSI-RS resources of the higher layer configuration apply different candidate set configuration methods and numbers of configured Trigger resources and/or physical layer dynamic notification methods. In addition, the combination method of various signaling in the embodiments above may be freely configured, without being limited to the methods of the embodiments above. Moreover, the terminal side may be notified, via the higher layer signaling of the UE-Specific, the IMR. Multiple CSI-RS resources may be configured with one set of IMRs, and multiple CSI-RS resources may also be configured with multiple sets of IMRs.

In another embodiment, software for instructing CSI feedback signaling configuration is also provided, the software being used for executing the technical solutions described in the embodiments mentioned above.

In another embodiment, a storage medium is also provided, the storage medium storing the software mentioned above, and the storage medium comprising but not limited to an optical disk, a floppy disk, a hard disk, an erasable storage device, etc.

According to the downlink CSI feedback method provided by various embodiments of the present invention above, the base station side flexibly configures the terminal side to feed back various kinds of CSI information, thus enabling the base station side to flexibly and dynamically acquire the CSI, and in turn performing precise link self-adaption and data transmission. By means of the method of the present invention, the terminal side may reduce the uplink feedback overhead and measurement complexity.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The above description is only the preferred examples of the present invention, which is not used to limit the present document. Any amendments, equivalent substitutions, improvements, etc. within the principle of the disclosure are all included in the scope of the protection of the disclosure.

What is claimed is:

1. A method for instructing channel state information (CSI) feedback signaling configuration, comprising:
   a base station notifying a terminal, via the first higher layer signaling of a UE-Specific search space, a plurality of CSI reference signal (CSI-RS) resources for measuring CSI, wherein the higher layer is a layer higher than physical layer in an open system interconnection (OSI) layer model and wherein the CSI-RS resources comprises at least one of:
   corresponding time frequency positions of the CSI-RS resources in a respective subframe, aerial port number configuration of the CSI-RS resources, a period and a subframe offset of the CSI-RS resources, a sequence identifier of the CSI-RS resources, and power control information of the CSI-RS resources; and
   the base station instructing the terminal to feed back the CSI corresponding to the CSI-RS resources;
   wherein the step of the base station instructing the terminal to feed back the CSI corresponding to the CSI-RS resources comprises:
   the base station dynamically instructing, through a physical layer dynamic signaling, the terminal to select and feedback corresponding CSI via feedback triggering signaling bits in DCI Format 0 or DCI format 4 or a random access response or uplink scheduling grant signaling, and via a resource position where DCI Format 0 or DCI format 4 or a random access response or uplink scheduling grant signaling which belongs to the terminal and is blindly detected by the terminal side is located;
   wherein the feedback triggering signaling bits in DCI Format 0 or DCI format 4 or a random access response or uplink scheduling grant signaling are 2 bits or 1 bit, in the case of 2 bits, where 00 represents no CSI of any CSI-RS resource is triggered, and 01-11 respectively represent triggering CSI of two different aggregation modes of the CSI-RS resources and interference assumptions of the CSI-RS resources;
   wherein the resource position where DCI Format 0 or DCI format 4 or a random access response or uplink scheduling grant signaling is located comprises at least one of: (i) a first combination and a second combination of a starting position of a corresponding CCE, a corresponding aggregation level, and a corresponding offset CCE number of the resource position with respect to an initial blind detection position, wherein each of the first combination and second combination indicates a respective different one of the two different aggregation modes and interference assumptions of the CSI-RS resources, and (ii) a corresponding system frame number, wherein the system frame number being odd indicates a different one of two different aggregation modes and interference assumptions than the system frame number being even;
   wherein before the step of the base station instructing the terminal side to feed back the CSI corresponding to the CSI-RS resource, the method further comprising:
   the base station notifying the terminal, via a second higher layer signaling of the UE-Specific search space, a candidate configuration set of CSI needing to be fed back in the multiple CSI-RS resources, wherein the candidate configuration set indicates at least two sets of CSI-RS resources for measuring CSI.

2. The method according to claim 1, wherein the step of the base station notifying the terminal, via the second higher layer signaling of the UE-Specific search space, a candidate configuration set of CSI needing to be fed back in the multiple CSI-RS resources comprises:
   the base station using a bitmap to notify the terminal the candidate configuration set, wherein the length of the bitmap is 3 or 4 or 7 or 8, and each bit in the bitmap corresponds to a different aggregation and interference assumption measurement feedback mode of CSI-RS resources configured.

3. The method according to claim 1, wherein the number of the CSI-RS resources is 2 or 3.

4. The method according to claim 1, wherein when the number of the CSI-RS resources is 2 or 3, the feedback triggering signaling bit of DCI Format 0 or DCI format 4 or the random access response or uplink scheduling grant signaling is 1 bit, and the terminal is instructed; via the resource position where DCI Format 0 or DCI format 4 or the random access response or uplink scheduling grant signaling is located and the feedback triggering signaling 1 bit, to feed back CSI of different aggregation modes and interference assumptions of the CSI-RS resources.

5. The method according to claim 1, wherein when the number of the CSI-RS resources is 2 or 3, the base station notifies the terminal, via the second higher layer signaling of the UE-Specific search space, N pieces of candidate CSI of different aggregation modes and/or interference assumptions of the CSI-RS resources, where N>0.

6. A base station, comprising a hardware processor and a memory, and the hardware processor is configured to execute the programming modules stored in the memory, wherein the programming modules comprise:
  a first notification module, configured to notify a terminal, via the first higher layer signaling of a UE-Specific search space, a plurality of CSI reference signal (CSI-RS) resource for measuring channel state information (CSI), the higher layer is a layer higher than physical layer in an open system interconnection (OSI) layer model and the CSI-RS resources comprising at least one of: corresponding time frequency positions of the CSI-RS resources in a respective subframe, aerial port number configuration of the CSI-RS resources, a period and a subframe offset of the CSI-RS resources, a sequence identifier of the CSI-RS resource, and power control information of the CSI-RS resources;
  an instruction module, configured to instruct the terminal to feed back the CSI corresponding to the CSI-RS resources; and
  wherein instructing comprises using a dynamic instruction sub-module, configured to dynamically instruct, through a physical layer dynamic signaling, the terminal to select and feedback corresponding CSI, via feedback triggering signaling bits in DCI Format 0 or DCI format 4 or a random access response or uplink scheduling grant signaling, and via a resource position where DCI Format 0 or DCI format 4 or a random access response or uplink scheduling grant signaling which belongs to the terminal and is blindly detected by the terminal is located;
  a second notification module, configured to notify, before the instructing, the terminal side, via a second higher layer signaling of the UE-Specific search space, a candidate configuration set of CSI needing to be fed back in the multiple CSI-RS resources, wherein the candidate configuration set indicates at least two sets of CSI-RS resources for measuring CSI;
  wherein the feedback triggering signaling bits in DCI Format 0 or DCI format 4 or a random access response or uplink scheduling grant signaling are 2 bits, where 00 represents no CSI of any CSI-RS resources is triggered, and 01-11 respectively represent CSI of two different aggregation modes and interference assumptions of the CSI-RS resource are triggered;
  the resource position where DCI Format 0 or DCI format 4 or a random access response or uplink scheduling grant signaling is located comprises at least one of:
  (i) a first combination and a second combination of a starting position of a corresponding CCE, a corresponding aggregation level, and a corresponding offset CCE number of the resource position with respect to an initial blind detection position, wherein each of the first combination and second combination indicates a respective different one of the two different aggregation modes and interference assumptions of the CSI-RS resources, and (ii) a corresponding system frame number, wherein the system frame number being odd indicates a different one of two different aggregation modes and interference assumptions than the system frame number being even.

7. The base station according to claim 6, wherein the second notification module comprises;

a candidate notification sub-module, configured to notify the terminal side the candidate configuration set via a bitmap, wherein the length of the bitmap is 3 or 4 or 7 or 8, and each bit in the bitmap corresponds to a different aggregation and interference assumption measurement feedback mode of CSI-RS resources configured.

8. A terminal, comprising a hardware processor and a memory, and the hardware processor is configured to execute the programming modules stored in the memory, wherein the programming modules comprise:
  a first receiving module, configured to receive a plurality of CSI reference signal (CSI-RS) resources for measuring channel state information (CSI) from a base station via a first higher layer signaling of a UE-Specific search space, the higher layer is a layer higher than physical layer in an open system interconnection (OSI) layer model and the CSI-RS resources comprising at least one of: a corresponding time frequency positions of the CSI-RS resources in a respective subframe, aerial port number configuration of the CSI-RS resources, a period and a subframe offset of the CSI-RS resources, a sequence identifier of the CSI-RS resource, and power control information of the CSI-RS resources;
  a selection module, configured to select and feedback CSI corresponding to the CSI-RS resources according to the received first higher layer signaling;
  a dynamic receiving sub-module, configured to receive instructions, through a physical layer dynamic signaling, to select and feedback corresponding CSI via feedback triggering signaling bits in DCI Format 0 or DCI format 4 or a random access response or uplink scheduling grant signaling, and via a resource position where DCI Format 0 or DCI format 4 or a random access response or uplink scheduling grant signaling which belongs to the terminal and is blindly detected by the terminal side is located; and
  a second receiving module, configured to receive, before receiving the instructions, a candidate configuration set of CSI needing to be fed back in the multiple CSI-RS resources from the base station via a second higher layer signaling of the UE-Specific search space, wherein the candidate configuration set indicates at least two sets of CSI-RS resources for measuring CSI;
  wherein the feedback triggering signaling bits in DCI Format 0 or DCI format 4 or a random access response or uplink scheduling grant signaling are 2 bits, where 00 represents no CSI of any CSI-RS resources is triggered, and 01-11 respectively represent CSI of two different aggregation modes and interference assumptions of the CSI-RS resource are triggered;
  wherein the resource position where DCI Format 0 or DCI format 4 or a random access response or uplink scheduling grant signaling is located comprises at least one of:
  (i) a first combination and a second combination of a starting position of a corresponding CCE, a corresponding aggregation level, and a corresponding offset CCE number of the resource position with respect to an initial blind detection position, wherein each of the first combination and second combination indicates a respective different one of the two different aggregation modes and interference assumptions of the CSI-RS resources, and (ii) a corresponding system frame number, wherein the system frame number being odd indicates a different one of two different aggregation modes and interference assumptions than the system frame number being even.

9. The base station according to claim 8, wherein the second receiving module comprises:
  a candidate receiving sub-module, configured to obtain the candidate configuration set of the terminal side by receiving a bitmap, wherein the length of the bitmap is 3 or 4 or 7 or 8, and each bit in the bitmap corresponds to a different aggregation and interference assumption measurement feedback mode of CSI-RS resources configured.

* * * * *